US011522873B2

(12) United States Patent
Chu et al.

(10) Patent No.: US 11,522,873 B2
(45) Date of Patent: Dec. 6, 2022

(54) DETECTING NETWORK ATTACKS

(71) Applicant: DataVisor, Inc., Mountain View, CA (US)

(72) Inventors: Kuanyu Chu, Mountain View, CA (US); Hongyu Cui, Beijing (CN); Arthur Meng, Fremont, CA (US); Zhong Wu, San Jose, CA (US); Yunfeng Xi, Santa Clara, CA (US); Yinglian Xie, Cupertino, CA (US); Ting-Fang Yen, Sunnyvale, CA (US); Fang Yu, Sunnyvale, CA (US)

(73) Assignee: DataVisor, Inc., Mountain View, CA (US)

( * ) Notice: Subject to any disclaimer, the term of this patent is extended or adjusted under 35 U.S.C. 154(b) by 978 days.

(21) Appl. No.: 16/236,976

(22) Filed: Dec. 31, 2018

(65) Prior Publication Data

US 2019/0207960 A1 Jul. 4, 2019

Related U.S. Application Data

(60) Provisional application No. 62/611,911, filed on Dec. 29, 2017.

(51) Int. Cl.
*H04L 29/06* (2006.01)
*H04L 9/40* (2022.01)
(Continued)

(52) U.S. Cl.
CPC ...... *H04L 63/1416* (2013.01); *G06F 16/9024* (2019.01); *G06F 17/18* (2013.01);
(Continued)

(58) Field of Classification Search
CPC ..... G06N 20/20; G06F 16/9024; G06F 17/18; G06K 9/6215; G06K 9/6218; G06K 9/6224; H04L 63/1416; H04L 63/1433
See application file for complete search history.

(56) References Cited

U.S. PATENT DOCUMENTS

2006/0149674 A1* 7/2006 Cook .................. G06Q 40/02
705/44
2007/0169194 A1 7/2007 Church et al.
(Continued)

OTHER PUBLICATIONS

Authorized officer Lee W. Young, International Search Report and Written Opinion in PCT/US2018/068194, dated Apr. 15, 2019, 11 pages.
(Continued)

*Primary Examiner* — Brandon Hoffman
*Assistant Examiner* — Thong P Truong
(74) *Attorney, Agent, or Firm* — Fish & Richardson P.C.

(57) ABSTRACT

Methods, systems, and apparatus, including computer programs encoded on computer storage media, for detecting network attacks. One of the methods includes obtaining input data associated with a plurality of accounts associated with a particular entity; extracting features from the input data; performing unsupervised attack ring detection using the extracted features, wherein the unsupervised attack ring detection identifies suspicious clusters of accounts that have strong similarity or correlations in the high dimensional feature space; and generating an output for the detected attack rings.

20 Claims, 5 Drawing Sheets

(51) Int. Cl.
*G06N 20/20* (2019.01)
*G06F 16/901* (2019.01)
*G06K 9/62* (2022.01)
*G06F 17/18* (2006.01)

(52) U.S. Cl.
CPC ......... *G06K 9/6215* (2013.01); *G06K 9/6218* (2013.01); *G06K 9/6224* (2013.01); *G06N 20/20* (2019.01); *H04L 63/1433* (2013.01)

(56) References Cited

U.S. PATENT DOCUMENTS

| | | |
|---|---|---|
| 2007/0289013 A1 | 12/2007 | Lim |
| 2010/0095374 A1 | 4/2010 | Gillum et al. |
| 2012/0137367 A1 | 5/2012 | Dupont et al. |
| 2017/0041242 A1 | 2/2017 | Isobe |

OTHER PUBLICATIONS

Authorized officer Sun Hwa Lee, International Preliminary Report on Patentability in PCT/US2018/068194, dated Jul. 9, 2020, 10 pages.

\* cited by examiner

FIG. 1

Application Fraud-200+Accounts

| First Name | Email | Age | State | FICO | Bureau Info Match | In Fraud DB |
|---|---|---|---|---|---|---|
| Irma H | IrmaH512@gmail.co | 45 | MA | 790 | YES | NO |
| Carolyn F | CarolynF119@gmail..com | 27 | NY | 725 | YES | NO |
| Celina P | CelinaP130@gmail.com | 34 | CA | 800 | YES | NO |
| Ned A | NedA91@gmail.com | 30 | NC | 742 | YES | NO |
| Hilda G | HildaG823@gmail.com | 55 | FL | 803 | YES | NO |
| Buford N | BufordN42@gmail.com | 46 | WI | 785 | YES | NO |
| Paulita H | PaulitaH617@gmail.com | 29 | OR | 780 | YES | NO |
| Earnestine G | EarnestineG12@gmail.com | 49 | WA | 777 | YES | NO |

102 → Age; 104 → FICO; 106 → Bureau Info Match; 108 → In Fraud DB

Application Fraud-200+Accounts

| First Name | Product Applied | Email String | IP | Device | Browser |
|---|---|---|---|---|---|
| Irma H | Premier | IrmaH512 | 67.198.236.72 | iPhone 5 OS 9 | Chrome |
| Carolyn F | Premier | CarolynF119 | 67.198.236.74 | iPhone 5s OS 9 | Chrome |
| Celina P | Premier | CelinaP130 | 108.171.209.68. | iPhone 5s OS9 | Chrome |
| Ned A | Premier | NedA91 | 23.27.12.71 | iPhone 5 OS 9 | Chrome |
| Hilda G | Premier | HildaG823 | 184.170.253.77 | iPhone 5 OS 9 | Chrome |
| Buford N | Premier | BufordN42 | 67.198.236.174 | iPhone 5 OS 9 | Chrome |
| Paulita H | Premier | PaulitaH617 | 108.171.209.92. | iPhone 5s OS | Chrome |
| Earnestine G | Premier | EarnestineG12 | 23.27.13.71.219 | iPhone 5 OS9 | Chrome |
| | Same card product | First + Last + Birthday 202 | All IPs come from data centers 204 | Old iPhone device with same system 206 | Same browser 208 |

200

DETECTING NETWORK ATTACKS

CROSS-REFERENCE TO RELATED APPLICATIONS

This application claims the benefit under 35 U.S.C. § 119(e) of the filing date of U.S. Patent Application No. 62/611,911, for Detecting Network Attacks, which was filed on Dec. 29, 2017, and which is incorporated here by reference.

BACKGROUND

This specification relates to detecting network attacks.

The attack landscape for network attacks is rapidly changing. In the digital era today, attackers are finding it much more effective to perform attacks from a larger number of individual accounts. Although the damage is smaller per account, the overall aggregated impact can be significantly larger.

Part of this is fueled by a "de-personalization" of personal information. Today, as a result of past data breaches to various entities, conventional Knowledge Based Authentication (KBA) can often be easily bypassed for most users by obtaining information from social media, public records, and the dark web. For example, a loan can be applied for by an attacker with a synthetic identity created from information stolen during a targeted data breach.

SUMMARY

Unsupervised machine learning (UML) is category of machine learning techniques that work without requiring labeled input data. Instead, UML infers a function to describe the hidden structures of "unlabeled" input data points.

UML approaches broadly include anomaly detection techniques that attempt to identify outliers and clustering/graph analysis techniques that focus on studying the relationships and connectivity among different input data. This specification describes a UML engine developed based on the latter approach, combining clustering techniques and graph analysis algorithms together to discover correlated fraudulent or suspicious patterns from unlabeled data. By analyzing the distance and connectivity between data points that represent accounts and their activities across a large time period, the UML engine is able to automatically discover new abuse, fraud, and money laundering activities.

In general, one innovative aspect of the subject matter described in this specification can be embodied in methods that include the actions of obtaining input data associated with a plurality of accounts associated with a particular entity; extracting features from the input data; performing unsupervised attack ring detection using the extracted features, wherein the unsupervised attack ring detection identifies suspicious clusters of accounts that have strong similarity or correlations in the high dimensional feature space; and generating an output for the detected attack rings.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The unsupervised attack ring detection identifies suspicious clusters by reducing feature dimensions and determining a distance function that computes a distance between data points. The selection of particular features and distance functions are guided by one or more of: feature weights assigned to features based on importance; initial detection results based on global intelligence network or known fraud signals; or statistical analyses of various feature distribution from the input data. The unsupervised attack ring detection groups all data points to generate clusters, wherein the clustering process is non-exclusive such that each account can belong to different clusters, and wherein each cluster is created by a different set of criteria.

Output from the unsupervised attack ring detection is used as training data to automatically train a supervised learning model and detect additional individual malicious accounts that share similar patterns with the already captured ones. The feature extraction includes generating categories of features that describe each user account from both structured and unstructured input data. The categories of features include one or more of profile information, behaviors and activities, origins and digital fingerprints, contents and metadata, and relationships between accounts. The number of feature dimensions automatically adjust to changes in the type of input data fields or the number of input data fields. Generating the output for the detected attack rings includes ranking detected accounts, assigning confidence scores to the detected accounts, and categorizing attack rings by a respective nature of their attacks. The obtaining the input data includes receiving one or more of continuous event streams or multiple batch input files that describe user account profiles or different types of account activities. The unsupervised attack ring detection further comprises using graph analysis to link clusters that share similar accounts or strong features together, wherein the graph analysis is based on a graph where the nodes represent clusters and the edges link similar clusters. Identification of tightly connected sub-graph components from the graph analysis provides an indication of attack rings. The unsupervised attack ring detection further outputs detection reasons, the detection reasons are based on the attributes and values shared by clusters of correlated accounts determined by the unsupervised attack ring detection.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 illustrates an anonymized snapshot of eight accounts from an account application fraud ring.

FIG. 2 illustrates an anonymized snapshot of the same eight accounts according to additional dimensions of data.

Like reference numbers and designations in the various drawings indicate like elements.

DETAILED DESCRIPTION

Figure 3:
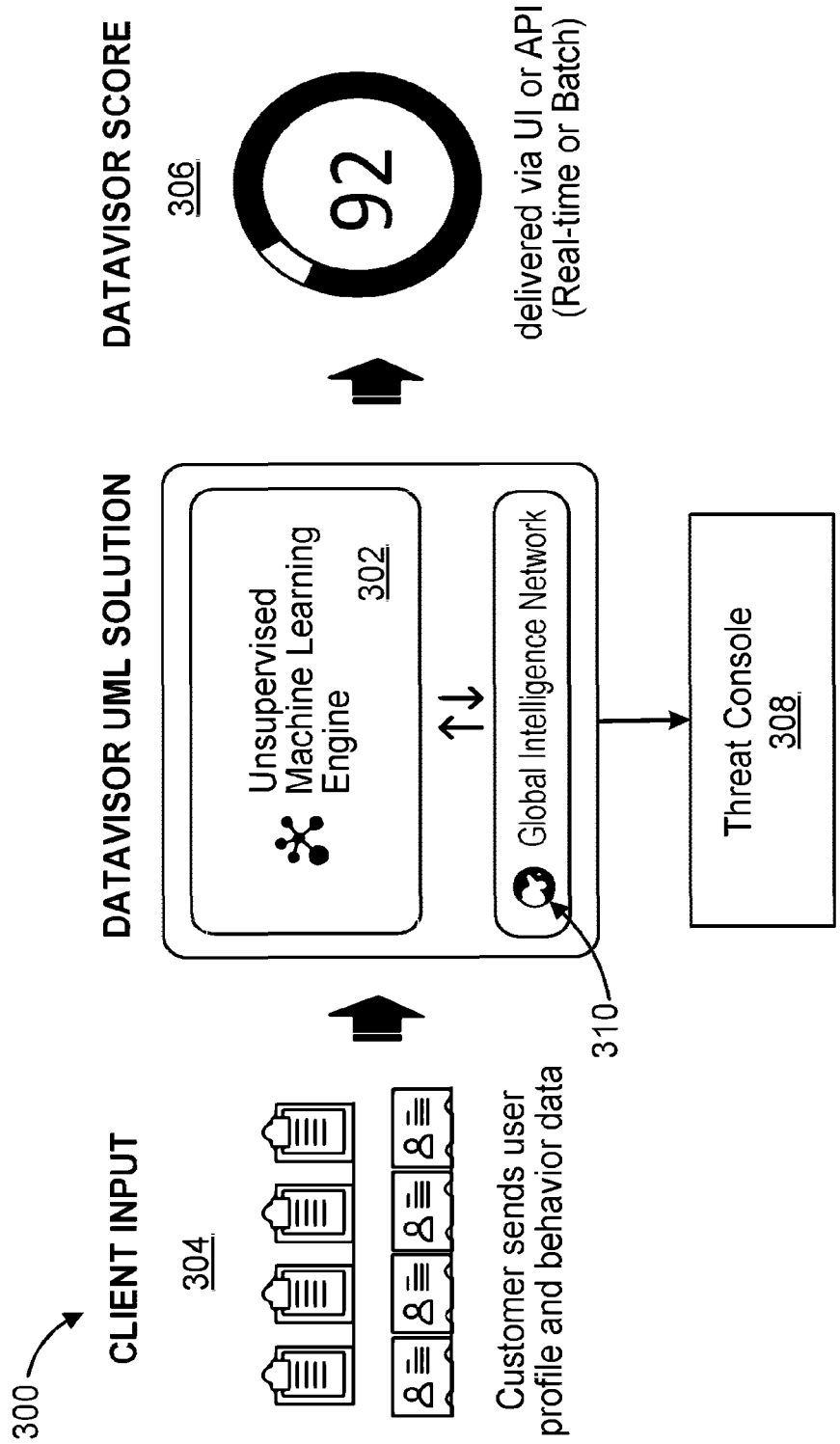
FIG. 3 illustrates an example UML architecture.

There is an increase in software tools and data resources available to attackers. Attackers have millions of data centers to choose from to host attacking accounts. Attackers also have easy access to stolen or synthetic identities, remote access to inexpensive global labor, and access to device emulator technology to help hide their true identities. As a consequence, there are two major trends to modern attacks:

1. Organized and Massive

Attacks, launched by organized fraud or crime rings, can be composed of many individual accounts that seem legitimate in isolation. This results in each account appearing less suspicious and maximizing the overall damage.

2. Mimic Legitimate Account Behaviors

Attackers constantly adopt new techniques to mimic legitimate account behaviors, which increases the difficulty of detecting attacks. Among these attack techniques, a notable one is incubating accounts so they gain history before conducting any damage. According to the DataVisor Research Labs, 44% of accounts are incubating "sleeper cells" that can be activated to launch attacks at a much later time. See, DataVisor Online Fraud Report, which can be found at https://www.datavisor.com/portfolio-items/datavisor-online-fraud-report/?portfolioID=6850.

With the increasing levels of sophistication of modern attacks, there are shortcomings of existing solutions:

They are Reactive in Detection

Existing solutions, even supervised machine learning models, are reactive as they purely rely on historical attack patterns or experiences to detect attacks.

Existing rules or supervised machine learning models are largely derived based on either labels of previously observed attacks or expert knowledge of past loss experiences. As attackers rapidly change their patterns, it is difficult to derive rules or models that can maintain effectiveness. Labels often require months to generate and settle, and model tuning is a time intensive process even by the most experienced data scientists. Since new sophisticated attacks often involve many different types of events and steps, fast and effective manual rule derivation becomes impossible. Thus, traditional approaches are becoming less effective against these evolving attacks.

They Examine Events or Accounts in Isolation

Most defense systems today examine each account or event individually in isolation, unable to analyze links across accounts and view a global picture.

Unfortunately, viewing data in isolation is increasingly ineffective for detecting modern attacks, in which each account is more stealthy and harder to detect. For example, the accounts may conduct very low volume activities to stay under the radar. To detect these modern coordinated attacks, it is necessary to analyze the global population of accounts together to reveal the subtle correlations among them.

They Cannot Effectively Leverage New Digital Information

With the trend of services and attacks moving online, effectively leveraging associated types of digital data, e.g., IP addresses, email domains, device models, browser types and OS versions, can significantly enhance detection ability.

However, many existing vendors focus on reputation signals of one specific digital signal, for example, device fingerprints or email addresses. Compared with individual digital signals, the combination of multiple dimensions is far more powerful in detection. For instance, an account using a particular web browser on a newer device platform with an old operating system should raise flags, as such combination is highly uncommon. Yet even sophisticated conventional detection solutions and models today typically cannot effectively leverage all available digital information together.

UML Engine

This specification describes a UML engine developed based an unsupervised learning approach that combines clustering techniques and graph analysis algorithms together to discover correlated fraudulent or suspicious patterns from unlabeled data. By analyzing the distance and connectivity between data points that represent accounts and their activities across a large time period, the UML engine is able to automatically discover new abuse, fraud, and money laundering activities.

The UML engine is different from other approaches, including, for example:

The UML Engine Detects New Attacks Proactively

The UML engine does not require labels or training data. It is proactive and adaptive towards changing attack patterns, and can often provide 30-50% additional detection results over existing systems by detecting new attacks early, even at account application or registration time.

The UML Engine Correlates all Accounts in Real-Time

The UML engine processes all events and account activities together to analyze the correlations and similarities across millions or hundreds of millions of accounts. The UML engine is able to reveal subtle, hidden structures across abusive, fraudulent, or money laundering accounts in real-time.

The UML Engine Leverages New Digital Information Effectively

The UML engine both feeds and ingests information from the other sources. For example, a global intelligence network (GIN) system specializes in consolidating and computing the intelligence of multiple digital fingerprints together. In addition, the GIN aggregates learned attack patterns to derive fine-grained, rich signals that improve the detection of the UML engine.

In additional to differentiators over other detection methods, the UML engine has a number of advantages.

Flexible with Input Data Fields and Volumes

Common questions for any machine learning algorithm are what input data fields are needed and how much data is enough for it to be effective. The UML engine is much more tolerant of missing data fields and low data volumes.

Low False Positive Rates

Unlike anomaly detection and other unsupervised approaches that generate many false positives, UML engine results are highly accurate and can be used directly through APIs without manual review. The accuracy is typically well over 90%, often over 99%, and sometimes can be greater than 99.99%.

Low Re-Tuning Overhead

The UML engine does not need frequent re-tunings since its predictive power is not based on intelligence derived from historical experience. It is proactive and adaptive to new changing attack patterns, and can therefore maintain high performance over time without re-tuning. This is different from supervised machine learning models, which decay in effectiveness over time.

Transparent Detection Reasons

The clusters of correlated accounts detected by the UML engine have clear indicators of what attributes and values are shared across them, and what hidden links are present. As a result, the UML engine outputs more transparent and convincing detection reasons compared to other machine learning approaches.

Illustrative Fraud Case Study

The following is an illustrative example of how the UML engine can detect a real world fraud ring that may have avoided detection by other detection systems. This anonymized example highlights a fraud ring comprised of over 200 credit card accounts from a large bank. In particular, FIG. 1 illustrates an anonymized snapshot 100 of eight accounts from an account application fraud ring.

As illustrated by the example accounts shown in FIG. 1, the 200+ accounts all resided in low risk regions 102, had a high FICO score 104, matched bureau data 106, and were not in the existing fraud database 108. The accounts did not have any risky signals that were similar to any previously known or seen attacks. As a result, all of these accounts can pass through the other existing fraud detection systems that rely on these dimensions.

By contrast, the UML engine not only examined the above dimensions of data, but also looked at other digital attributes of credit card applications across all accounts. In doing so, the UML engine uncovered subtle suspicious correlations that were indicative of the presence of a fraud ring. FIG. 2 illustrates an anonymized snapshot 200 of the same eight accounts shown in FIG. 1 according to additional dimensions of data. The resulting analysis shows:
- All emails had the same pattern of being created by the account holder's first name, last name initial, and birthday 202.
- The IP addresses were all associated with high-risk data centers 204.
- The accounts all used an old iPhone—the iPhone 5 or 5s—with the same OS version 206.
- All of the accounts performed their activity with Chrome, though Safari is the default browser app for iPhones 208.

In this case, the UML engine determined based on these correlations that these 200+ accounts belonged to the same fraud ring right at the card application time. The UML engine assigned each of the accounts a score of 0.92 (out of 1.0), meaning they are highly likely of being fraudulent.

Technical Details

The UML engine works in concert with other technologies, including an optional supervised machine learning engine, the global intelligence network, and an optional automated rules engine. The automated rules engine keeps the transparent nature of rules-based systems but automatically suggests rules to create, modify, and sunset.

FIG. 3 illustrates a UML architecture 300. The input to the UML engine 302 is raw data 304 in the form of either continuous event streams, e.g. from a real-time integration setting, or multiple batch input files that describe user account profiles or different types of account activities, e.g. login event logs, purchase event logs, or add-comment event logs, in a batch integration setting. In a real-time setting, the output 306 is a score and reason codes for each input event. In a batch setting, the output is a list of detected suspicious accounts with associated scores and reason codes. The UML engine output also feeds into a threat console 308, which can provide a user interface to visualize attack rings and allow investigation of each detected incident and account. The UML engine 302 reads signals from a global intelligence network 310, using the global attack information to assist detection of new attacks. In the meantime, all the newly detected attack information is also sent to the global intelligence network 310 so it can use the attack information for detecting future attacks.

The UML solution can serve both real-time and batch traffic. The real-time component is implemented as a distributed, in-memory system with the same algorithmic logic as the batch system. As events come in, the real-time component keeps historical account states and continuously updates and evaluates them. Clustering and graph analysis is triggered on demand by an incoming event to search and analyze a subset of related accounts and events. Due to memory and latency constraints, the system will perform a parallel search of the most relevant clusters and sub-graph components. This search expands when more space and time become available. The batch system periodically calibrates the real-time component for computational drifts caused by memory and latency constraints, so that the real-time results are close to the fidelity from a batch system.

Figure 4:
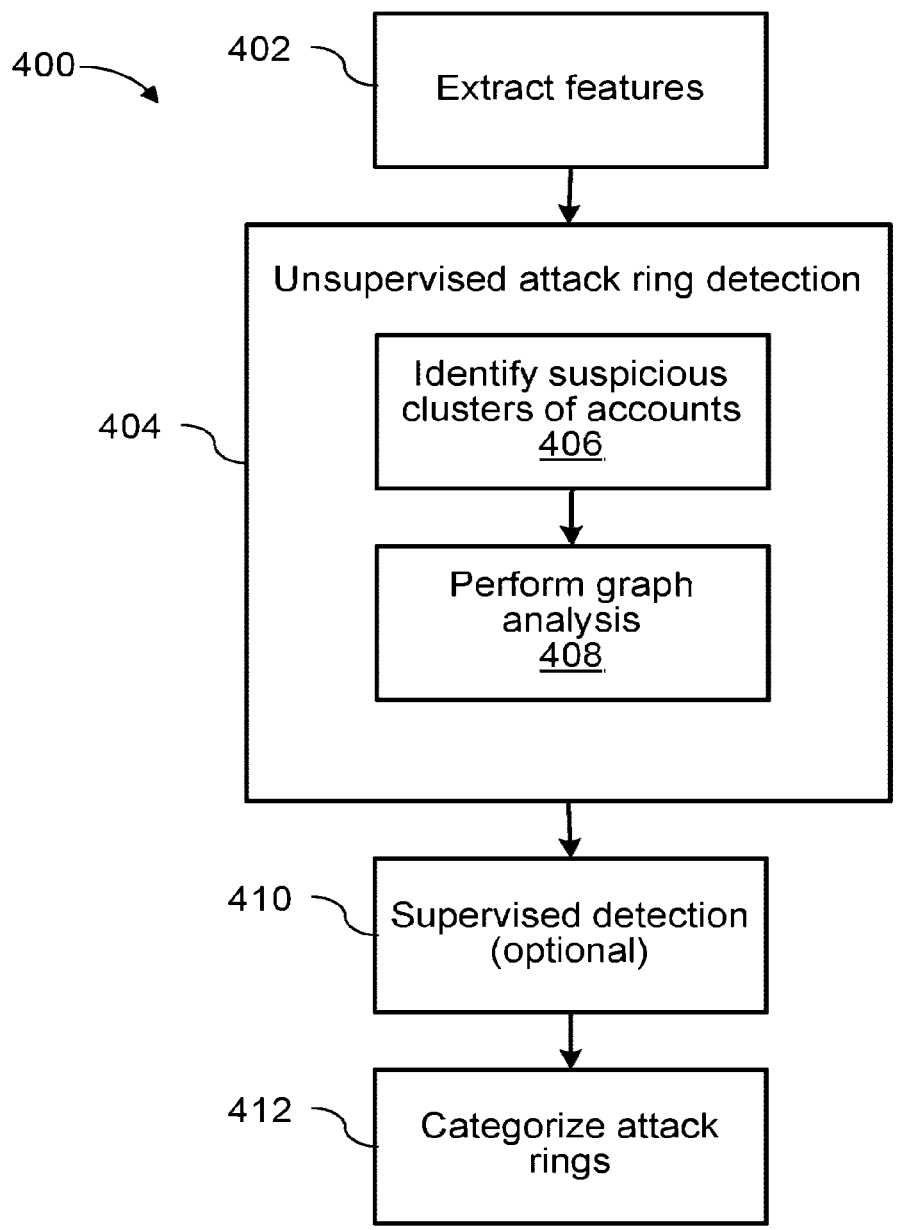
FIG. 4 is a flow diagram of an example process for identifying fraudulent accounts.

FIG. 4 is a flow diagram of an example process 400 for identifying fraudulent accounts. For convenience, the process 400 will be described as being performed by a system of one or more computers, located in one or more locations, and programmed appropriately in accordance with this specification. For example, the process 400 can be performed by an appropriately programmed system comprising a UML engine, e.g., the UML engine 302.

Between the input and output, there are four major steps that the UML engine performs:
- Dynamic feature extraction;
- Unsupervised attack ring detection;
- (Optional) Supervised detection; and
- Result categorization and ranking.

These four steps can precisely identify accounts that have a high likelihood as corresponding to abusive, fraudulent, or money laundering rings by discovering the hidden links among the corresponding account-based data points. The algorithms can be run on top of a distributed big data infrastructure with algorithmic optimizations so that the detection is capable of operating at real-time or near real-time.

Dynamic Feature Extraction

The system extracts features 402. The goal of the unsupervised machine learning is to generate a comprehensive and meaningful set of features to describe each input account of an entity. The "unsupervised" nature means that it does not have prior knowledge of the new attack patterns nor know which features will be effective. Because it comes in without these assumptions, the UML engine is configured to operate across a very high dimensional feature space and be comprehensive in extracting features.

Figure 5:
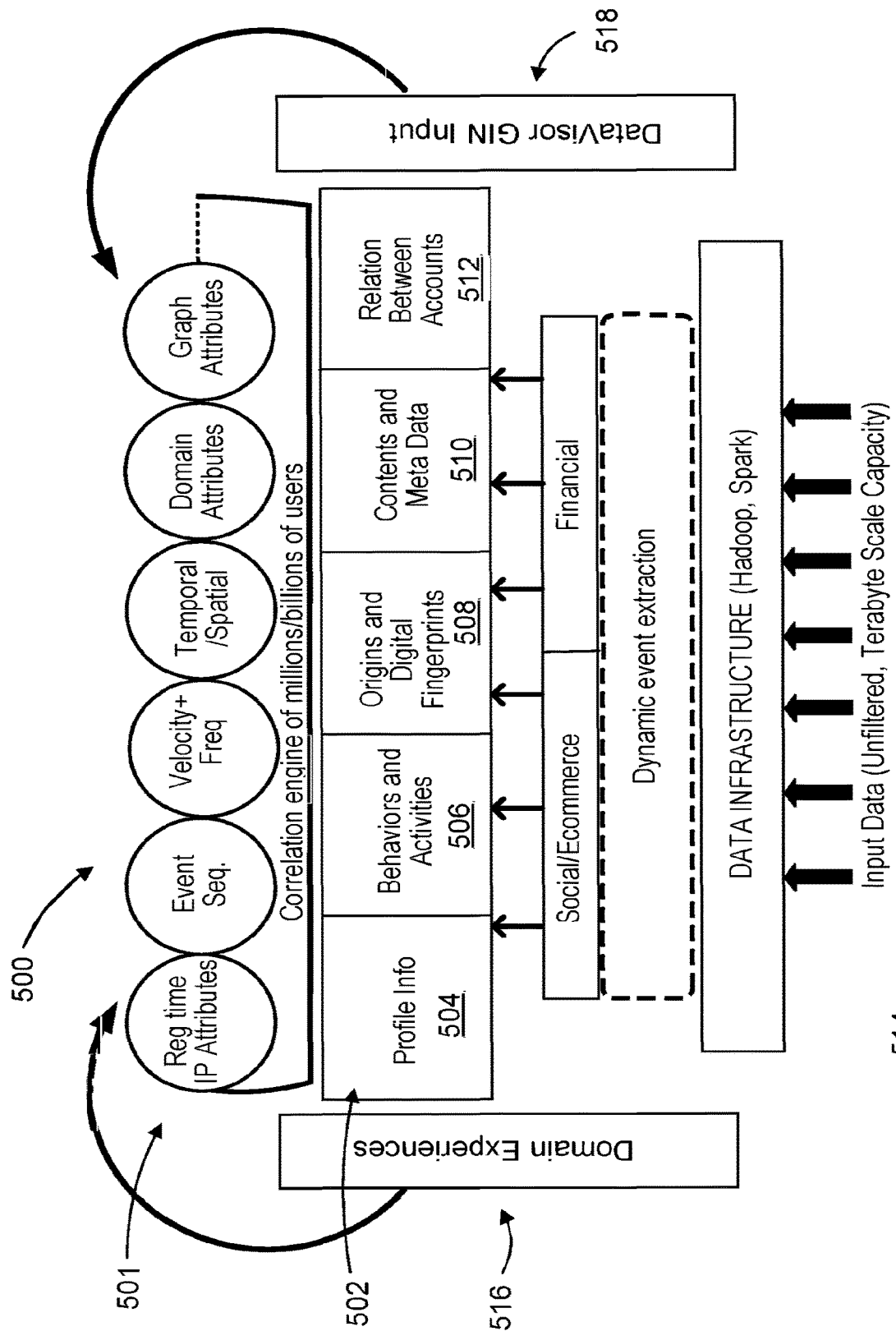
FIG. 5 is a diagram illustrating example features generated by the UML engine.

The UML engine generates the a number of categories of features to describe each user account. FIG. 5 is a diagram 500 illustrating features generated by the UML engine. The top line shows some example features 501 that the system extracts from the raw input data 514. The categories of features include:
- Profile information 504: Demographic information associated with an account, usually provided at the account application or user registration time. It may include user account nickname, income range, age, gender, and address.
- Behaviors and activities 506: What the account has done and when. For example, payment events to an entity associated with the account can include a timestamp, payment amount and method.

Origins and digital fingerprints 508: Information describing the access methods of an account, e.g., to services provided by the entity, including its device type and version, browser information, IP address, and geographic origins.

Contents and metadata 510: Text and pictures generated by an account, such as comments, profile photos, and phone call records.

Relationships between accounts 512: Interactions and relationships between different accounts, e.g., one account sending money to other accounts that are friends or contacts.

For unstructured text, the UML engine leverages natural language processing (NLP) techniques to derive rich textual and contextual features. For image input, the UML engine supports meta-data attributes such as image title, creation time, location, generation source, format, and resolution. However, it can be easily expanded to support more sophisticated features, such as number of pixels, color codes, etc. For relationship information between accounts, the UML engine describes them using graph attributes for example, directional and bi-directional links, degrees of nodes, edge weights, graph neighborhood features, and community features.

This process is dynamic in that, for each category of feature 502, the UML engine will derive on-the-fly as many features as applicable based on the input data schema, often on the order of tens of thousands to hundreds of thousands of features. In some implementations, millions of features are created. For example, based on the input account event types and sequences, the UML engine can derive a variety of features including event frequencies, velocities, time interval gap distributions, diurnal patterns, and sub-sequence patterns. When the input data fields need to change or increase over time, the number of feature dimensions can automatically adjust accordingly.

The UML engine's dynamic feature extraction differs from other feature engineering approaches in four major ways:

1. The features created from input data, e.g., obtained from user profiles or activity events, are designed based on decades of experience in researching and fighting real-life abuse, fraud, and money laundering activities (domain experience 516). These features, which are shared across all clients in the same industry sector, are constantly increasing.
2. The features are enriched with the global intelligence network input 518, which contains aggregated signals about attack patterns or intelligence about various digital fingerprints, such as IP addresses, email domains, operating system (OS) and browser model and version, phone prefixes, particularly for digital information.
3. The features describe both structured and unstructured input data, as well as a variety of relations across accounts, while most existing solutions are based on a fixed set of pre-defined features from structured input data.
4. The list of features dynamically expands when input data has more fields in their schema.

Unsupervised Attack Ring Detection

The system performs attack ring detection (step 404). In this step, the UML engine performs correlation analysis, described below, across all accounts, and identifies attack rings. An attack ring can be defined as a collection of malicious accounts that have strong similarity or correlations in their features, and hence are likely operated by a same group of attackers.

Clustering Analysis

Based on the input feature vectors, which correspond to lists of individual features extracted as described above, the UML engine first identifies suspicious clusters of accounts that have strong similarity or correlations in the high dimensional feature space (step 406). Identifying suspicious clusters of accounts includes reducing feature dimensions and determining a distance function that computes the distance between data points. When the distance function is properly designed with a subset of important features, only truly suspicious accounts will form tight clusters while legitimate accounts will not group. This clustering method is much more accurate at finding attack rings. Other methodologies create clusters of legitimate accounts and then rely of noisy anomaly detection approaches to separate groups out.

The selection of features and distance functions are guided in the following manner:

Important features will be assigned higher weights; their importance is based on the industry sector and the targeted attacks. Here the system leverages the rich domain experience 516 to guide pre-defining important feature categories for different setups. For example, knowing that an account's address is valid and that their information matches credit bureau data is important when detecting bank account application fraud. This information can be obtained, for example, using human specified or annotated data. However, this information is less important when detecting spam attacks in social networks, where normal people often provide an empty or vague address when signing up.

The global intelligence network (GIN) can optionally augment the UML engine with initial detection results based on digital fingerprint signals. The initial results provided by GIN are typically noisy but provide insights that guide the selection of important feature dimensions and their weights. In another words, signals from GIN do not lead to final clustering results but enhance the confidence of feature selection. For example, sharing IP addresses from a hotel location is not very suspicious, while sharing proxy IP addresses is a lot more suspicious.

The UML engine performs a variety of statistical analyses of various feature distributions from the raw input data. These feature distributions also serve as input to help auto infer the most important feature dimensions.

With the important feature dimensions and distance functions selected, the UML engine groups all data points to generate clusters. The clustering process is iterative and non-exclusive. It iteratively clusters data points based on different combinations of selected features, weights, and distance functions. As a result, each account can belong to different clusters, where each cluster is created by a different set of criteria. For example, an account can belong to a cluster with address and location features being more important dimensions, and meanwhile belong to another cluster with event sequences and behavior patterns being more dominant features.

The detection does not always depend on the existence of important features. A strong correlation of multiple accounts across a large number of seemingly unimportant features can also be an indication of suspiciousness, and the UML engine considers this case as well. For example, a group of accounts that follows almost the same behavior pattern, e.g., when they login, when they log out, when they update account information, can be very suspicious, even when traditionally these behaviors may not be considered very important features for transaction fraud.

In some implementations, during each iteration, the selected features, their weights, and the distance functions are automatically adjusted until they meet all of the following criteria:

- A ratio of intra-cluster distance to inter-cluster distance is small enough based on a specified threshold. The threshold can be pre-defined, and can be adjusted according to the tradeoffs between coverage and false positives.
- The clustering results stabilize and converge.
- (Optional) The output clusters capture at least a certain percentage of the GIN classification results. This can be a noisy measure.

The iteration process may be guided in a few different ways. In some implementations, the system ranks all features based on their global distribution skewness in the input data. The less skewed distributed features will be ranked the first, and the most skewed distributed features will be ranked the last. The iteration will select one or a few features iteratively based on this ranking. In another example setting, the system uses pre-determined configuration combinations based on the use cases, e.g., to detect mass registration attacks or to detect fraudulent transactions, and use those configuration combinations as a starting point. If the clustering results are not ideal, then the algorithm can automatically expand by adding more features e.g., according to the distribution skewness ranking, or adjust the distance functions and weights according to pre-determined list and order, e.g., larger weights to higher ranked features, until the clustering results stabilize and converge.

Given the high dimensionality of the data and the highly iterative process, the challenge is to bound the computation complexity so that the clusters can be computed and converge quickly, even in a real-time setting. The UML engine can include efficient and scalable proprietary algorithms in selecting features and computing distance functions, with the following distinguishing characteristics:

- It is much more efficient than common methods of dimensionality reduction, such as Principal Component Analysis (PCA), and does not assume that the input data follows a relationship.
- The resulting clusters are highly accurate in pinpointing the exact abuse, fraud, or money laundering rings. This goal is achieved with built-in domain knowledge and algorithms to automatically optimize the clustering results towards different use cases.

Graph Analysis

The clustering results provide suspicious groups of accounts that are highly similar or correlated on either important features or over a large number of feature dimensions. The UML engine further consolidates the results using graph analysis to link clusters that share similar accounts or strong features together (step 408). As a graph problem, the clusters are nodes and edges link these similar clusters. The edge weight between two clusters is a function of the number of shared accounts, the shared feature dimensions, and the cluster sizes.

This process examines a different aspect of connectivity between accounts. It discovers not just direct correlations but also indirect, transitive similarities and correlations across accounts, e.g. this process can group accounts A and C together if A is similar to B and B is similar to C. After the graph analysis, a "weak" cluster may be linked together with several "strong" clusters to raise the confidence of detection of this weak cluster. This process enhances the detection coverage and increases the detection accuracy.

The tightly connected sub-graph components after this step typically indicate the existence of attack rings.
Optional): Supervised Learning Detection Optionally, the output from the unsupervised attack ring detection can serve as training data to automatically train a supervised learning model and detect additional individual malicious accounts that share similar patterns with the already captured ones (step 410). Advanced supervised machine learning algorithms can be leveraged to build this component alongside a proprietary system stack.

Compared to common supervised approaches, the supervised learning detection can emphasize two different design decisions:

1. It is optimized for fast and constant retraining without manual tuning, so that the outputs from the unsupervised model can help adjust the model quickly.
2. It is optimized for high accuracy and low false positive rate so that the output results can directly be applied to client production use.

This step outputs a set of detected individual bad accounts, which will be combined with the detected attack rings to maximize the detection coverage according to coverage and false positive requirements.
Result Ranking and Categorization The system ranks the detected accounts, assigns confidence scores to the accounts, and categorizes the attack rings by the nature of their attacks (step 412). The input to this step is the output of step 404 and optionally step 410.

All accounts are assigned a score from 0.0 to 1.0, with 0.0 being not suspicious at all and 1.0 being most suspicious. The scores help guide the policy setting for client actions, such as auto-blocking accounts that are 0.8 and above and manually reviewing the remaining ones above 0.0, or another chosen threshold score value. Result ranking and score assignment uses a function based on the associated attack ring size and the corresponding cluster distances. Intuitively, the smaller the cluster distance and the larger the ring size, the higher the score.

If optional step 410 is performed, then the output accounts from step 404 will also have a supervised machine learning detection scores in step 410 (training score). Thus, the system calibrates the scores together with these overlapped accounts as anchor points to normalize the scores output from steps 404 and 410.

Categorization is the last step in this process. This includes adding reason codes to each cluster, which highlights the important characteristics of the attack ring. To categorize attack rings, the UML engine classifies them by many attributes including event types, attack techniques, bot versus human patterns, and account ages. The following shows some example categorizations:

- Automated account opening fraud;
- Mass account takeover password testing ring;
- Successful account takeover spam ring;
- Manual transaction fraud;
- Structured transfers indicative of money laundering; or
- Rapid transfer of funds indicative of money laundering.

This categorization can help clients of the system determine appropriate actions. For example, for account takeover fraud rings, a client may not wish to directly shut down these accounts, but instead prefer to contact the owners to help them recover their accounts.
Architecture and Achieving Real-Time Detection The entire UML engine, from computation to data access and storage, can be built on the latest big data infrastructure.

For example, Apache Spark, HDFS, Hadoop, Apache HBase, and Elasticsearch can all be used to support the system in different capacities.

Figure 6:
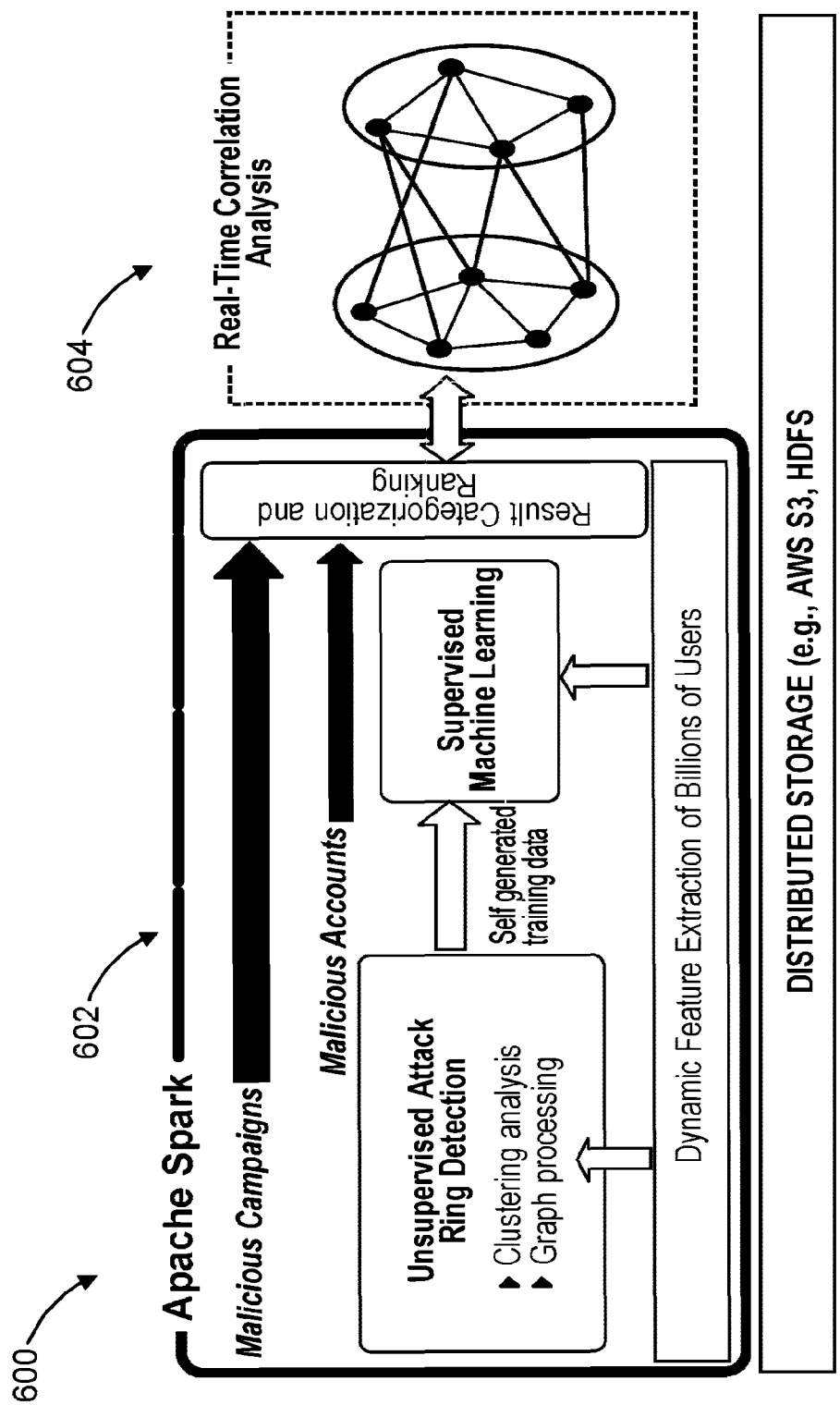
FIG. 6 shows a system diagram illustrating an example of batch and real-time processing on a big data infrastructure.

FIG. 6 shows a system diagram 600 illustrating batch and real-time processing on a big data infrastructure. The left side of the figure is a batch UML engine 602 implemented on top of Apache Spark. If real-time processing is required, the UML engine additionally includes a real-time component 604 shown on the right side of the figure.

The real-time component is implemented as a distributed, in-memory system with the same algorithmic logic as the batch system. As events come in, the real-time component keeps historical account states and continuously updates and evaluates them. The clustering and graph analysis is triggered on demand by an incoming event to search and analyze a subset of related accounts and events. Due to memory and latency constraints, the system will perform a parallel search of the most relevant clusters and sub-graph components. This search expands when more space and time become available. The batch system periodically calibrates the real-time component for computational drifts caused by memory and latency constraints, so that the real-time results are close to the fidelity from a batch system.

Both the batch system and the real-time component are built using the same algorithms, but they are designed with different optimization goals. The batch system targets maximal coverage and accuracy, while the real-time system also needs to meet latency and throughput requirements. The performance of the real-time system with respect to the batch system is easily forecasted by latency and throughput requirements versus machine capacity. The real-time system is built to be horizontally scalable, so requirements can be easily met with additional machine resources.

CONCLUSION

Unsupervised machine learning technologies enable a new way of combating abuse, fraud, and money laundering activities. They are more proactive and adaptive toward catching new and constantly changing attacks. The key challenges are handling the vast volume of data in the new digital era and being able to analyze all accounts and events at once to discover patterns accurately.

An advanced detection system often employs multiple different technologies to maximize effectiveness. For sophisticated organizations that have already invested in rules or supervised machine learning approaches, the UML engine provides a unique, complementary solution. With the trend of further digitalization and the increase of data volume, unsupervised technologies will play an even more important role over time to automatically detect and stop attacks without human intervention.

In this specification the term "engine" will be used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   obtaining input data associated with a plurality of accounts associated with a particular entity;
   extracting features from the input data and generating feature vectors, each feature vector corresponding to individual features extracted for a particular account;
   performing unsupervised attack ring detection using the extracted features across the plurality of accounts to identify one or more attack rings, wherein the one or more attack rings correspond to suspicious clusters of accounts that have strong similarity or correlations in the high dimensional feature space indicating that the clusters are operated by a same group of one or more malicious entities, the unsupervised attack ring detection comprising:
      identifying the suspicious clusters of accounts based on the input feature vectors, comprising determining a distance function to be applied to a subset of features indicative of suspicious accounts,
      using graph analysis to link together clusters that share similar accounts or strong features, and
      categorizing each cluster with particular characteristics of a corresponding attack ring; and
   generating an output for the detected attack rings identifying suspicious accounts.

2. The method of claim 1, wherein the unsupervised attack ring detection identifies suspicious clusters by reducing feature dimensions and determining a distance function that computes a distance between data points.

3. The method of claim 2, wherein the selection of particular features and distance functions are guided by one or more of:

feature weights assigned to features based on importance;
initial detection results based on global intelligence network or known fraud signals; or
statistical analyses of various feature distribution from the input data.

4. The method of claim 2, wherein the unsupervised attack ring detection groups all data points to generate clusters, wherein the clustering process is non-exclusive such that each account can belong to different clusters, and wherein each cluster is created by a different set of criteria.

5. The method of claim 1, wherein output from the unsupervised attack ring detection is used as training data to automatically train a supervised learning model and detect additional individual malicious accounts that share similar patterns with the already captured ones.

6. The method of claim 1, wherein the feature extraction comprises generating categories of features that describe each user account from both structured and unstructured input data.

7. The method of claim 6, wherein the categories of features include one or more of profile information, behaviors and activities, origins and digital fingerprints, contents and metadata, and relationships between accounts.

8. The method of claim 6, wherein the number of feature dimensions automatically adjust to changes in the type of input data fields or the number of input data fields.

9. The method of claim 1, wherein generating the output for the detected attack rings comprises ranking detected accounts, assigning confidence scores to the detected accounts, and categorizing attack rings by a respective nature of their attacks.

10. The method of claim 1, wherein the obtaining the input data includes receiving one or more of continuous event streams or multiple batch input files that describe user account profiles or different types of account activities.

11. The method of claim 1, wherein the unsupervised attack ring detection further comprises using graph analysis to link clusters that share similar accounts or strong features together, wherein the graph analysis is based on a graph where the nodes represent clusters and the edges link similar clusters.

12. The method of claim 11, wherein identification of tightly connected sub-graph components from the graph analysis provides an indication of attack rings.

13. The method of claim 1, wherein the unsupervised attack ring detection further outputs detection reasons, the detection reasons are based on the attributes and values shared by clusters of correlated accounts determined by the unsupervised attack ring detection.

14. A system comprising:
one or more computers and one or more storage devices storing instructions that are operable, when executed by the one or more computers, to cause the one or more computers to perform operations comprising:
obtaining input data associated with a plurality of accounts associated with a particular entity;
extracting features from the input data and generating feature vectors, each feature vector corresponding to individual features extracted for a particular account;
using an unsupervised machine learning engine to perform unsupervised attack ring detection using the extracted features across the plurality of accounts to identify one or more attack rings, wherein the one or more attack rings correspond to suspicious clusters of accounts that have strong similarity or correlations in the high dimensional feature space indicating that the clusters are operated by a same group of one or more malicious entities, the unsupervised attack ring detection comprising:
identifying the suspicious clusters of accounts based on the input feature vectors, comprising determining a distance function to be applied to a subset of features indicative of suspicious accounts,
using graph analysis to link together clusters that share similar accounts or strong features, and
categorizing each cluster with particular characteristics of a corresponding attack ring; and
generating an output for the detected attack rings.

15. The system of claim 14, wherein the unsupervised machine learning engine identifies suspicious clusters by reducing feature dimensions and determining a distance function that computes a distance between data points.

16. The system of claim 15, wherein the selection of particular features and distance functions are guided by one or more of:
feature weights assigned to features based on importance;
initial detection results based on global intelligence network or known fraud signals; or
statistical analyses of various feature distribution from the input data.

17. He system of claim 15, wherein the unsupervised attack ring detection groups all data points to generate clusters, wherein the clustering process is non-exclusive such that each account can belong to different clusters, and wherein each cluster is created by a different set of criteria.

18. The system of claim 14, wherein output from the unsupervised attack ring detection is used as training data to automatically train a supervised learning model and detect additional individual malicious accounts that share similar patterns with the already captured ones.

19. The system of claim 14, wherein the feature extraction comprises generating categories of features that describe each user account from both structured and unstructured input data.

20. One or more computer-readable storage media encoded with instructions that, when executed by one or more computers, cause the one or more computers to perform operations comprising:
obtaining input data associated with a plurality of accounts associated with a particular entity;
extracting features from the input data and generating feature vectors, each feature vector corresponding to individual features extracted for a particular account;
performing unsupervised attack ring detection using the extracted features across the plurality of accounts to identify one or more attack rings, wherein the one or more attack rings correspond to suspicious clusters of accounts that have strong similarity or correlations in the high dimensional feature space indicating that the clusters are operated by a same group of one or more malicious entities, the unsupervised attack ring detection comprising:
identifying the suspicious clusters of accounts based on the input feature vectors, comprising determining a distance function to be applied to a subset of features indicative of suspicious accounts,
using graph analysis to link together clusters that share similar accounts or strong features, and
categorizing each cluster with particular characteristics of a corresponding attack ring; and
generating an output for the detected attack rings.

* * * * *

UNITED STATES PATENT AND TRADEMARK OFFICE
CERTIFICATE OF CORRECTION

PATENT NO. : 11,522,873 B2
APPLICATION NO. : 16/236976
DATED : December 6, 2022
INVENTOR(S) : Kuanyu Chu et al.

It is certified that error appears in the above-identified patent and that said Letters Patent is hereby corrected as shown below:

In the Claims

Column 16, Line 25, in Claim 17: delete "He" and insert --The--, therefor.

Signed and Sealed this
Seventh Day of February, 2023

Katherine Kelly Vidal
*Director of the United States Patent and Trademark Office*